(12) United States Patent
Rivault et al.

(10) Patent No.: US 11,931,789 B2
(45) Date of Patent: Mar. 19, 2024

(54) ASSEMBLY FOR DEFORMING METAL PARTS BY MAGNETIC PULSE

(71) Applicant: ADM28 S.ÀR.L, Luxembourg (LU)

(72) Inventors: Thomas Rivault, Toulouse (FR); Pierre Thouet, Montberon (FR)

(73) Assignee: ADM28 S.ÀR.L, Luxembourg (LU)

( * ) Notice: Subject to any disclaimer, the term of this patent is extended or adjusted under 35 U.S.C. 154(b) by 360 days.

(21) Appl. No.: 17/278,329

(22) PCT Filed: Sep. 19, 2019

(86) PCT No.: PCT/EP2019/075149
§ 371 (c)(1),
(2) Date: Mar. 21, 2021

(87) PCT Pub. No.: WO2020/058391
PCT Pub. Date: Mar. 26, 2020

(65) Prior Publication Data
US 2021/0346935 A1    Nov. 11, 2021

(30) Foreign Application Priority Data
Sep. 20, 2018   (FR) ...................................... 1858507

(51) Int. Cl.
*B21D 26/14*   (2006.01)
*B23K 20/06*   (2006.01)
*H01F 7/20*    (2006.01)

(52) U.S. Cl.
CPC .............. *B21D 26/14* (2013.01); *B23K 20/06* (2013.01); *H01F 7/202* (2013.01)

(58) Field of Classification Search
CPC .... B21D 26/14; Y10T 29/49803; B23K 20/06
(Continued)

(56) References Cited

U.S. PATENT DOCUMENTS

| 963,907 | A | * | 7/1910 | Larzelere | ............ | H01F 27/2847 336/223 |
| 3,126,937 | A | * | 3/1964 | Brower et al. | ......... | B21D 26/14 264/DIG. 45 |

(Continued)

FOREIGN PATENT DOCUMENTS

| CN | 106583977 A | * | 4/2017 | ............. B23K 37/00 |
| CN | 107971618 A | * | 5/2018 | ............. B23K 13/00 |

(Continued)

OTHER PUBLICATIONS

CN-106583977-A machine translation (Year: 2017).*
CN-107971618-A machine translation (Year: 2018).*

*Primary Examiner* — Michael W Hotchkiss
(74) *Attorney, Agent, or Firm* — H&I PARTNERS; Chai Im; C. Andrew Im

(57) ABSTRACT

An assembly to deform metal parts by magnetic pulse includes an induction coil having branches connected to a power supply. The branches extend adjacent to one another to define a slot. An active portion of the coil connected to the first and second branches, an active surface of the active portion being arranged opposite a part to be deformed. The assembly includes an integral mask cooperating in a detachable manner with all or a portion of the coil when the mask is in an operating position on the coil. The mask having a shape that is at least partially complementary to the shape of the coil such that when it is in the operating position, a first portion of the mask is inserted into the slot and a second portion of the mask covers the active surface of the coil. The mask being made of an electrically insulating material.

10 Claims, 3 Drawing Sheets

(58) Field of Classification Search
USPC .......................................................... 72/54
See application file for complete search history.

(56) References Cited

U.S. PATENT DOCUMENTS

| | | | | |
|---|---|---|---|---|
| 3,602,023 A | * | 8/1971 | Furth | H01F 7/202 |
| | | | | 72/56 |
| 3,654,787 A | * | 4/1972 | Brower | B21D 26/14 |
| | | | | 72/56 |
| 4,061,007 A | * | 12/1977 | Hansen | B64F 5/60 |
| | | | | 29/419.2 |
| 4,169,364 A | * | 10/1979 | Khimenko | H01F 7/202 |
| | | | | 29/419.2 |
| 5,953,805 A | * | 9/1999 | Steingroever | B21D 26/14 |
| | | | | 29/517 |
| 6,065,317 A | * | 5/2000 | Steingroever | B21D 39/04 |
| | | | | 72/430 |
| 6,229,125 B1 | * | 5/2001 | Livshiz | B21D 26/14 |
| | | | | 219/617 |
| 6,968,718 B2 | * | 11/2005 | Imamura | B21D 26/14 |
| | | | | 72/430 |
| 7,389,664 B1 | * | 6/2008 | Cheng | B21D 26/14 |
| | | | | 72/707 |
| 7,395,597 B2 | * | 7/2008 | Shao | B21J 7/30 |
| | | | | 72/56 |
| 7,954,357 B2 | * | 6/2011 | Bradley | B21D 26/14 |
| | | | | 72/466.8 |
| 2005/0205553 A1 | * | 9/2005 | Cheng | B23K 20/06 |
| | | | | 219/603 |
| 2006/0185412 A1 | * | 8/2006 | Shao | B23K 20/06 |
| | | | | 29/419.2 |
| 2007/0084261 A1 | * | 4/2007 | Golovashchenko | B21D 26/14 |
| | | | | 72/56 |
| 2008/0264130 A1 | * | 10/2008 | Blakely | B21D 39/04 |
| | | | | 72/54 |
| 2012/0006085 A1 | * | 1/2012 | Johnson | C22F 3/02 |
| | | | | 72/54 |
| 2016/0175980 A1 | * | 6/2016 | Golovashchenko | B23K 20/22 |
| | | | | 228/110.1 |
| 2016/0221059 A1 | * | 8/2016 | Goto | H01F 41/077 |
| 2016/0329141 A1 | | 11/2016 | Mandel | |
| 2020/0290147 A1 | * | 9/2020 | Pasquale | H01F 27/2847 |

FOREIGN PATENT DOCUMENTS

| | | |
|---|---|---|
| DE | 102004016414 A1 | 10/2005 |
| DE | 10207655 B4 | 9/2010 |
| JP | 2011161512 A | 8/2011 |
| WO | 9722426 A2 | 6/1997 |
| WO | 2015101469 A1 | 7/2015 |

\* cited by examiner

ASSEMBLY FOR DEFORMING METAL PARTS BY MAGNETIC PULSE

RELATED APPLICATIONS

This application is a § 371 application of PCT/EP2019/075149 filed Sep. 19, 2019, which claims priority from French Patent Application No. 18 58507 filed Sep. 20, 2018, each of which is incorporated herein by reference in its entirety.

FIELD OF THE INVENTION

The present invention belongs to the field of technology for the working of metal parts by magnetic pulse. More particularly, it belongs to the field of deforming metal parts by magnetic pulse, such as magnetic pulse forming, magnetic pulse welding or magnetic pulse crimping. The present invention relates to an assembly comprising a coil for deforming metal parts by magnetic pulse associated with an integral electrically insulated part of said coil.

BACKGROUND OF THE INVENTION

The deformation of metal parts by magnetic pulse is performed under the action of electromagnetic forces generated by a coil. This deformation makes it possible, either to perform forming operations, in order to shape a metal part according to the shape of a matrix, or to perform welding and/or crimping operations, in order to permanently mutually assemble two parts.

The coil generally consists of a first branch, through which the current released by the capacitors enters, and of a second branch in connection with the first branch, through which the current passes. The two branches are arranged one in relation to the other so as to substantially extend in the same direction in order to provide a slot of regular thickness of a few tens of millimetres.

In a manner known from the prior art, a device for deforming the metal parts by magnetic pulse comprises one or more capacitors connected to a coil in order to create a brief and intense magnetic field.

The capacitor or capacitors are used to store a certain amount of electrical energy. The intense magnetic field created is the result of a very rapid discharge of this electrical energy into the coil in the form of a variable current of very high intensity, within a very short time. By way of example, some devices may reach a few hundreds of thousands of amperes in a few microseconds.

The current generates a variable magnetic field between the coil and the part, previously placed close by, and induces Eddy currents in this part. These Eddy currents, associated with the surrounding magnetic field develop in the part forces that cause a sharp acceleration of said part in the direction of another part.

In particular according to the intensity level of the current generated, the collision angle and the collision speed, the part is either formed, or welded to another part.

In order to avoid any passage of electricity between a coil used and the part to be deformed, said coil requires an electrical insulation at the interface thereof with said part.

Indeed, the circulation of current of very high intensity in the part could lead to a destruction of the latter or the degradation thereof. Furthermore, this circulation could cause safety problems.

It is generally known to glue a layer of electrically insulating material on at least one portion of the surface of the coil, and in particular on an area intended to be opposite the part to be deformed, referred to as an "active portion", as described in documents DE102004016414, DE10207655 and JP2011161512.

The active portion corresponds to an induction area between the coil and the part or parts to be deformed.

In practice, the layer of electrically insulating material is made from the superposition of sheets made of polyimide polymer material. The sheets have a low mechanical resistance. A layer of adhesive tape is therefore generally applied to said sheets in order to form a protective film against any impacts or friction brought about during the installation of the part or parts to be deformed within the coil.

These sheets having, in addition, the drawback of a certain rigidity, the application thereof is delicate on the coils, the active portion of which has a complex geometric shape, for example having a geometric shape comprising a significant number of angles and/or convex and/or concave portions of small radius. Indeed, the sheets are carefully applied to avoid the creation of wrinkles. The areas of wrinkles are more sensitive to mechanical loads in the sense that they constitute areas more susceptible to breakage or to tearing. Furthermore, when a wrinkle is located facing the active portion of the coil, it causes a loss of efficiency in this area of the active portion because it creates a local excessive thickness.

It is also necessary to electrically insulate the two branches of the coil from one another, and therefore to apply sheets made of polyimide polymer material in the slot, on the portions opposite the first and second branches, in particular to avoid any generation of short-circuit, and therefore electric arc. It is therefore understood that performing this operation is all the more complicated as the thickness of the slot is reduced.

In view of the foregoing, the technical solution of the prior art for electrically insulating the coil is tedious to implement and requires significant know-how. By way of example, this technical solution may require up to one day of work according to the complexity of the geometric shape of the coil.

This solution is therefore expensive, in particular due to the preparation time required by a qualified person as described above. Furthermore, the damage of the layer made of electrically insulating material may involve the complete replacement of the coil to which it is attached, or at least the dismantling thereof in order to remove the damaged layer.

Also, the application of said layer is difficult to reproduce, which may cause differences of results between two identical operations respectively performed with distinct coils. The result may be significant quality problems.

SUMMARY AND OBJECT OF THE INVENTION

One object of the present invention is to overcome the aforementioned drawbacks by proposing an assembly for deforming metal parts by magnetic pulse, for example by magnetic pulse forming and/or magnetic pulse welding, comprising an induction coil comprising:

a first and a second branches intended to be connected to a power source, said first and second branches extending adjacent to one another so as to define a slot, and an active portion connected to the first and second branches, a surface of which, referred to as an "active surface", is intended to be disposed opposite a part to be deformed.

The assembly comprises an integral mask, configured to cooperate in a detachable manner with all or a portion of the coil. The mask has a shape that is at least partially complementary to the shape of the coil such that when said mask is in an operating position, it is inserted by a first portion, into the slot and it covers, by a second portion, the active surface of the coil, said mask being made of an electrically insulating material.

Thanks to these features, the assembly may be implemented rapidly and simply. Indeed, an operator simply applies the mask in the operating position thereof on the coil in order to form an assembly. This implementation requires no particular qualification.

The mask cooperating in a detachable manner with the coil and being made of one piece, it may be easily and rapidly removed from said coil, for example to undergo a quality control. Such a control may consist of dielectric tests.

Furthermore, thanks to these features, the costs related to the maintenance are considerably reduced since the life time of the mask is independent from that of the coil. Indeed, the replacement of the mask does not involve the replacement of the coil. To this end, it is possible to envisage, for a given assembly, a plurality of spare masks in the case where the mask used with the coil would be deteriorated.

In particular embodiments, the invention further meets the following features, implemented alone or in each of the technically operating combinations thereof.

In particular embodiments of the invention, the coil comprises a through opening wherein the slot opens. The mask comprises a third portion covering an inner peripheral surface of the opening when it is in operating position.

These features have the effect of ensuring the positioning and/or holding in position of the mask in the operating position thereof.

In particular embodiments of the invention, each first and second branch has a longitudinal face intended to be arranged on the side of the part to be deformed during the use of the assembly, the first and second branches being connected to one another by a junction area. The mask comprises a fourth portion covering at least partially the longitudinal faces and a face of the junction area, when said mask is in operating position.

This fourth portion has the effect of giving the mask a greater rigidity and mechanical resistance. Furthermore, the fourth portion makes it possible to facilitate the handling of the mask. The fourth portion increases the bearing surface of the mask against the coil, which makes it possible to ensure a better stability of the mask in operating position.

In embodiments of the invention, the mask is made of a flexible material.

This feature makes it possible to facilitate the placing in operating position of the mask on the coil and the removal thereof from said coil.

In embodiments of the invention, the mask is made of an elastic material.

This feature helps to facilitate the placing in operating position of the mask on the coil and the removal thereof from said coil.

In embodiments of the invention, the mask is made of a silicone material.

The mask may therefore be manufactured by overmoulding or by compression moulding or by injection, which helps to reduce the production costs and makes it possible to be able to make a multitude of masks of identical shape and having similar features.

In embodiments of the invention, the material wherein the mask is made is chosen to withstand a temperature at least equal to 200° C. and to have a dielectric strength at least equal to 20 kV/mm, so as to withstand the stresses to which the mask is subjected during the use of the assembly.

BRIEF DESCRIPTION OF THE FIGURES

The invention will be better understood upon reading the following description, given by way of non-limiting example, and made in reference to the figures that show.

In these figures, identical numerical references from one figure to another designate identical or similar elements. Moreover, for reasons of clarity, the drawings are not to scale, unless otherwise specified.

DETAILED DESCRIPTION OF THE INVENTION

The present invention relates to an assembly 10 for deforming metal parts by magnetic pulse, such as by magnetic pulse forming, by magnetic pulse welding or by magnetic pulse crimping. The assembly 10 forms part of a system comprising a power supply source. Typically, such a power supply source may be formed by a generator comprising one or more capacitors and a switch for releasing within a very short time interval the current stored in the capacitor or capacitors.

The assembly 10 comprises an induction coil 20 and a mask 30 made of electrically insulating material.

The mask 30 is configured to cooperate with said coil 20.

In the present text, the term "cooperate" means that the mask 30 and the coil 20, when they are in contact one against the other, are mutually interlocked.

Figure 7:
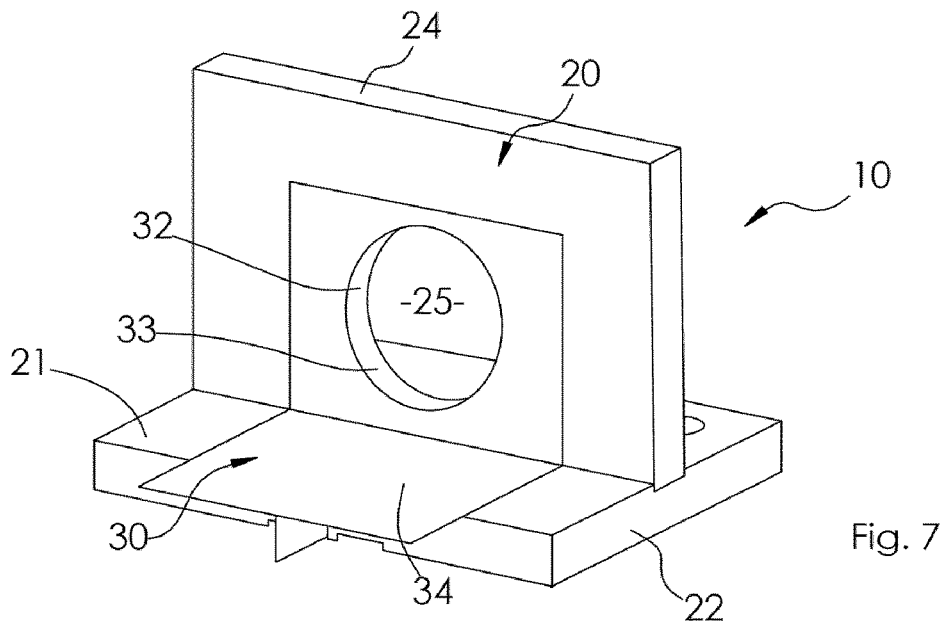
Figure 8:
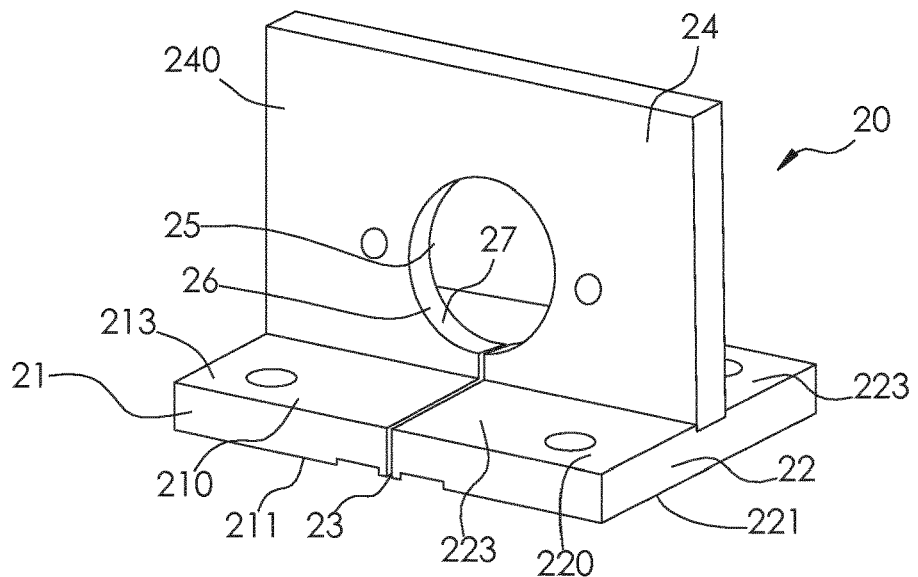
FIG. 8: a perspective view only of the coil of FIG. 7, and FIG. 9: a perspective view only of the mask of FIG. 7.
Figure 9:
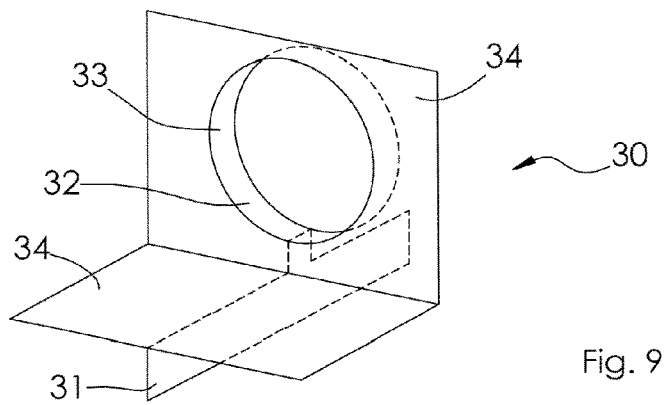

In the remainder of the text, three examples of embodiment of an assembly 10 are described. FIGS. 1 to 3 and 4 to 6 show respectively first and second examples of embodiments of the invention wherein the coils 20 are of the type referred to as a "flat coil," and are particularly adapted to performing operations for deforming flat parts. FIGS. 7 to 9 illustrate a third example of embodiment of the invention wherein the coil 20 is of the type referred to as a "cylindrical coil," and is particularly adapted to performing operations for deforming tubular parts.

The coil is designed so that the current density in an area of the coil is sufficient to meet the shaping and/or welding conditions. This area is referred to as hereafter as an "active portion".

Figure 1:
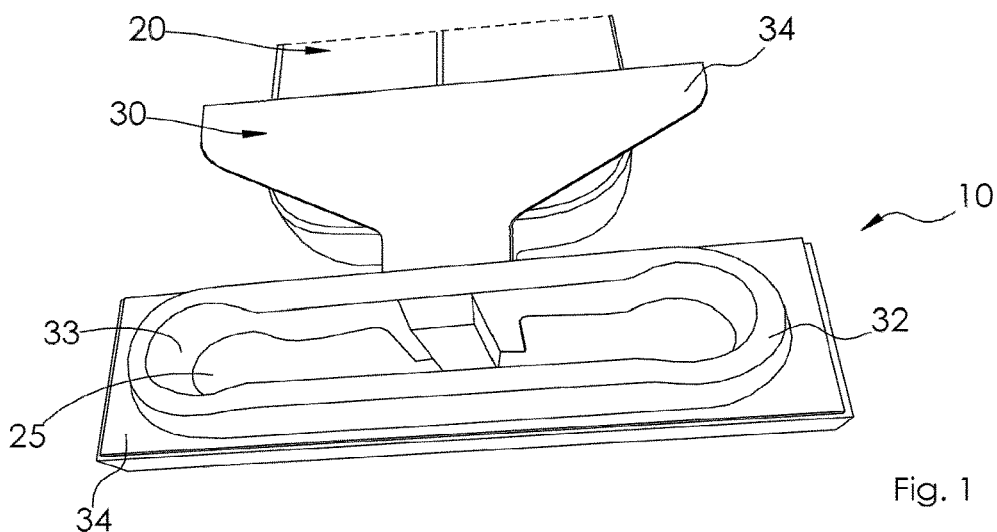
FIG. 1: a perspective view of an assembly for deforming metal parts by magnetic pulse according to a first example of embodiment of the invention, said assembly comprising a coil and a mask.
Figure 2:
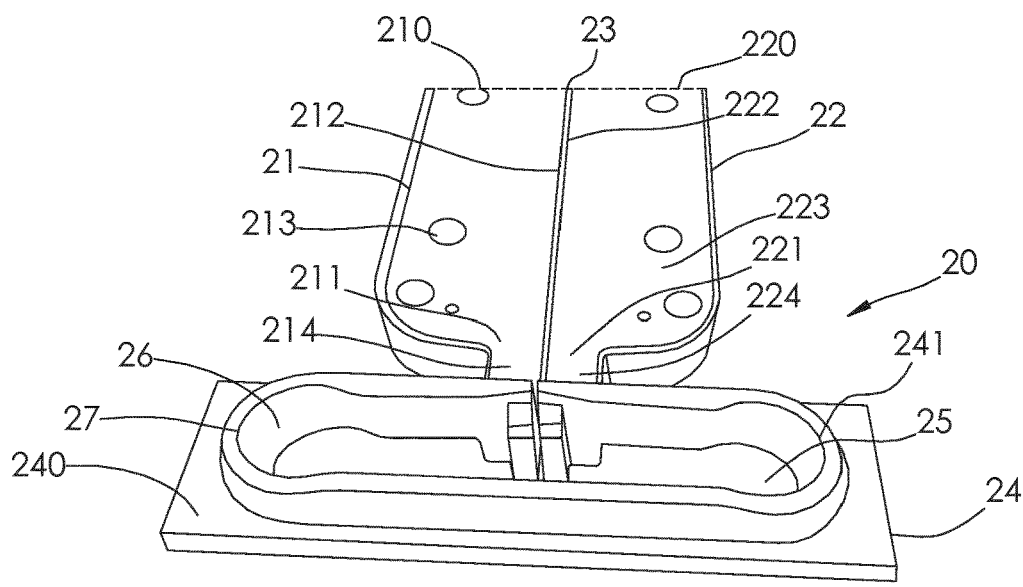
FIG. 2: a perspective view only of the coil of FIG. 1, FIG. 3: a perspective view only of the mask of FIG. 1, FIG. 4: a perspective view of an assembly for deforming metal parts by magnetic pulse according to a second example of embodiment of the invention, said assembly comprising a coil and a mask.
Figure 3:
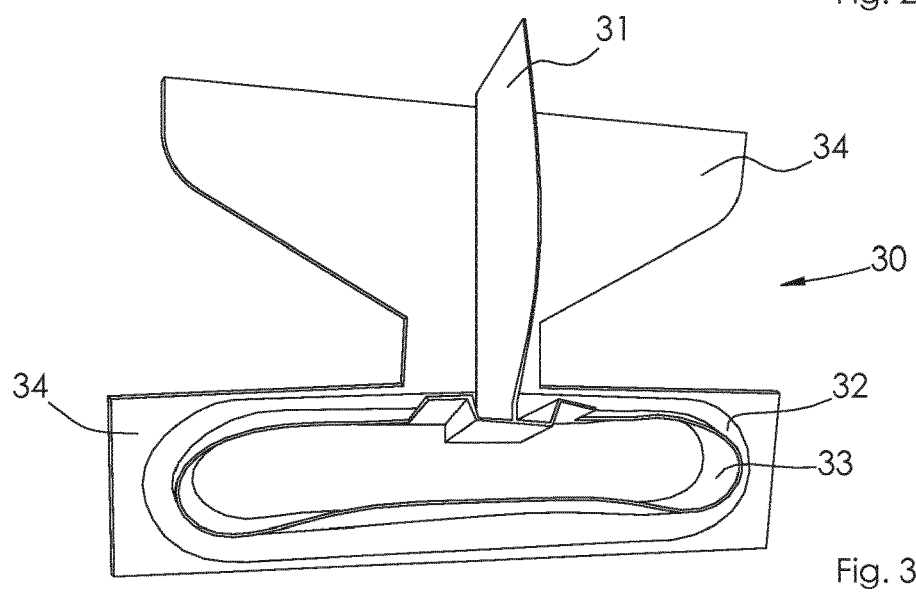

In the first example of embodiment shown in FIGS. 1 to 3, the mask 30 illustrated by FIG. 3 is configured to cooperate with the coil 20 shown in FIG. 2, when it is in a position referred to as an "operating position", so as to form an assembly 10 such as shown in FIG. 1.

Advantageously, the mask 30 and the coil 20 may cooperate in a detachable manner, such that the mask 30 may be removed from the coil 20 if necessary.

As shown in FIG. 2, the coil 20 comprises at least two branches connected to one another. One of the branches, referred to as a "first branch" 21 is intended to be connected to the power supply source.

The first branch 21 is connected to another branch, referred to here as a "second branch" 22. As shown in FIG. 2, said first and second branches 21 and 22 extend along substantially parallel longitudinal axes, respectively between the free end, referred to as a "first end" 210, 220, and an end through which they are indirectly connected to one another, referred to as a "second end" 211, 221.

The first and second branches 21 and 22 extend adjacent to one another so as to define a slot 23.

More specifically, the first and second branches 21 and 22 each have an inner flank 212, 222 arranged facing one another so as to define the slot 23.

The slot 23 is of constant width.

Each first and second branch 21 and 22 also has a longitudinal face 213, 223. The longitudinal faces 213 and 223 are intended to be arranged on the side of a part to be deformed during the use of the assembly 10.

In the first example of embodiment of the assembly 10, the first and second branches 21 and 22 of the coil 20 are connected to one another by a junction area 24.

The junction area 24 is in the form of a plate, through which is formed a through opening 25 comprising an inner peripheral surface 26.

A face 240 of the plate comprises a boss 241 intended to face the part to be deformed.

More particularly, in the first example of assembly 10, the boss 241 comprises a top arranged around the periphery of the opening 25, as shown in FIG. 2.

In one embodiment, the opening 25 has a straight section of substantially oblong shape.

In a non-limiting embodiment, each of the first and second branches 21 and 22 is joined at the junction area by a portion 214, 224 of reduced section in relation to said branches 21 and 22. Each portion 214, 224 is connected to one of the second ends 211, 221 of the branches 21, 22 as shown in FIG. 2.

Each portion 214, 224 of the coil 20 forms, with the second end 211, 221 of a branch 21, 22, a shoulder oriented towards the outside of the coil 20.

The slot 23 extends from the first ends 210, 220 of the branches 21 and 22 until the opening 25. In other words, the slot 23 extends along the branches 21 and 22 and portions 214, 224.

In the case of a flat coil such as described in this first example of embodiment, the current circulates through the coil 20, by penetrating into the first branch 21 and by emerging in the second branch 22, by passing through the junction area 24. The current is concentrated in the active portion, located in the junction area 24, on a layer delimited by an active surface 27, at the face 240 of the plate, at the top of the boss 241, and of thickness corresponding to the skin thickness. The current generates, in a space delimited between the part to be deformed and the active surface 27, a concentrated magnetic field.

Here it is understood that the geometric shape of the boss 241 depends in particular on that of the part to be obtained at the end of the deformation.

The mask 30 is configured so as to have a shape at least partially complimentary to the shape of the coil 20. To this end, the mask 30 comprises a first portion 31 inserted into the slot 23, when the mask 30 cooperates with the coil 20.

The first portion 31 preferably has a thickness chosen so that a mechanical clearance exists when said first portion 31 is inserted into the slot 23. Thus, the insertion thereof and the manual removal thereof from the slot 23 are facilitated. Such a thickness is for example equal to approximately eight tenths of a millimetre for a slot 23 having a width of one millimetre.

This thickness is also chosen for reasons of mechanical and dielectric strength of the mask 30.

The mask 30 comprises a second portion 32, covering the active surface 27 of the coil 20, when said mask 30 cooperates with the coil 20.

In a preferred shape illustrated in FIG. 3, the second portion 32 has a substantially geometric shape identical to the surface of the boss 241.

The second portion 32 preferably has a thickness less than one millimetre, for example five tenths of a millimetre, so as to avoid any risk of reduction of the efficiency of the action of the coil 20 on the part to be deformed.

In a preferred embodiment, the mask 30 comprises a third portion 33, covering the inner peripheral surface 26 of the opening 25 of the coil 20. Advantageously, the third portion 33 gives the mask 30 a greater rigidity and mechanical resistance. Furthermore, it contributes to ensuring the electrical insulation between the coil 20 and the part to be deformed.

In the first example of embodiment of the assembly 10, the third portion 33 has a shape complementary to the shape of the opening 25 so as to be able to cooperate with the latter when it is in operating position, as shown in FIG. 3. The third portion 33 therefore covers the inner peripheral surface 26 of the opening 25 when the mask 30 is in operating position.

Preferably, the mask 30 comprises a fourth portion 34, covering all or a portion of the longitudinal faces 213, 223, a face of each portion 214 and 224 and the face 240 of the plate, when the mask is in operating position. This fourth portion 34 also has the effect of giving the mask 30 a greater rigidity and mechanical resistance. Preferably, the mask may be dimensioned so as to only cover a portion of the longitudinal faces 213, 233 when the branches have a section of simple geometric shape, that is to say not comprising sharp angles and/or convex and/or concave portions of small radius; the other portion of the longitudinal faces 213, 233 is then covered by a layer of electrically insulating material known from the prior art. This feature has the interest of reducing the implementation costs of the present invention.

Moreover, the fourth portion 33 makes it possible to facilitate the handling of the mask and to increase the stability thereof on the coil, when it is in operating position.

Figure 4:
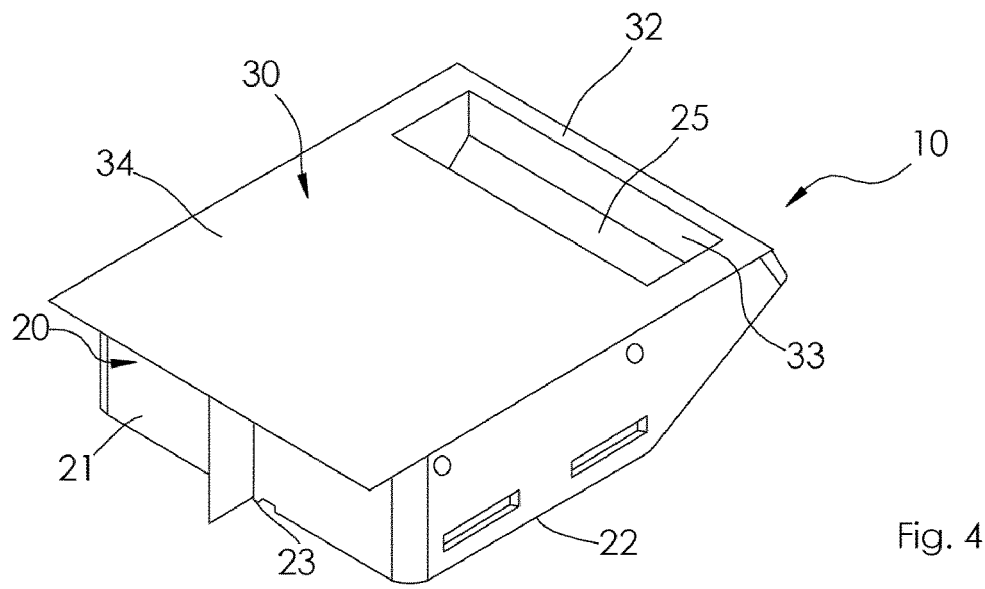
Figure 5:
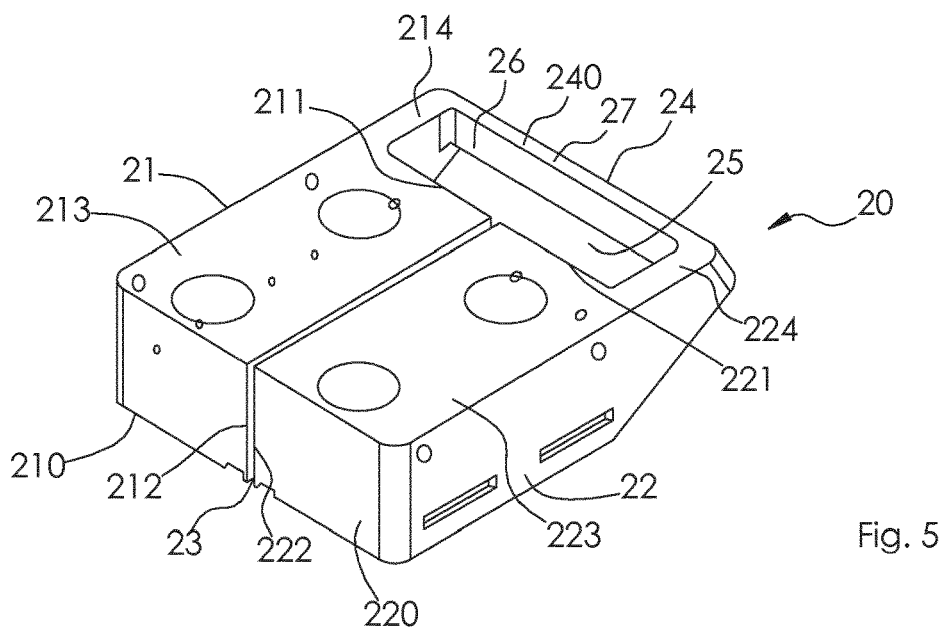
FIG. 5: a perspective view of a coil of FIG. 4, FIG. 6: a bottom perspective view only of the mask of FIG. 4, FIG. 7: a perspective view of an assembly for deforming metal parts by magnetic pulse according to a third example of embodiment of the invention, said assembly comprising a coil and a mask.
Figure 6:
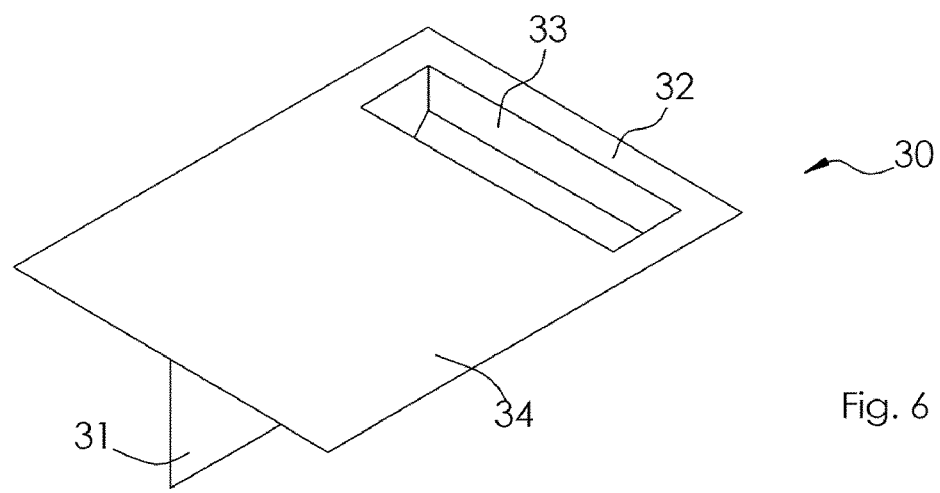

In the second example of embodiment shown in FIGS. 4 to 6, the mask 30 illustrated by FIG. 6 is configured to cooperate with the coil 20 shown in FIG. 5, when it occupies the operating position thereof, so as to form an assembly 10 such as shown in FIG. 4.

The coil 20 according to the second example of embodiment of the assembly 10 comprises a first and a second branch 21 and 22, as well as a junction area 24, such as previously described.

Each first and second branch 21 and 22 has a longitudinal face 213, 223, such as described above. The longitudinal faces 213 and 223 are intended to be arranged on the side of the part to be deformed during the use of the assembly 10.

The junction area 24 is connected by two portions 214, 224 as described for the first example of embodiment.

The junction area 24 differs from that previously described in that it has the shape of a third branch extending substantially perpendicular in relation to the longitudinal axes of the first and second branches 21 and 22.

Furthermore, the portions 214, 224 are configured such that the shoulders are arranged opposite one another.

As shown in FIG. 5, the opening 25 is delimited by the shoulders formed by the portions 214, 224 and the second ends 211, 221 of the branches 21 and 22, and by the junction area 24, which define an inner peripheral surface 26 of the opening 25. In the non-limiting example shown in FIG. 5, the opening 25 has a straight section of substantially rectangular shape.

The slot 23 extends from the first ends 210, 220 of the branches 21 and 22 until the opening 25, that is to say until the second ends 211, 221 thereof.

In the second example of embodiment of the assembly 10, the coil 20 is designed such that the active portion is located in the junction area 24, on a layer delimited by an active surface 27, at a face 240 of the third branch.

In the second example of embodiment of the assembly 10, the mask 30 comprises, in a similar manner to the first example of embodiment, a first portion 31 inserted into the slot 23 and a second portion 32 covering the active surface 27 of the coil 20, when the mask 30 cooperates with the coil 20.

The mask 30 also preferably comprises a third portion 33, such as previously described. In a similar manner to the first example of embodiment of the assembly 10, in this second example of embodiment, the third portion 33 has a shape complementary to the shape of the opening 25 so as to be able to cooperate with it when it is in operating position.

Preferably, the mask 30 comprises a fourth portion 34, covering at least partially the longitudinal faces 213, 223, a face of each portion 214 and 224, when the mask is in operating position.

This fourth portion 34 also has the effect of giving the mask 30 a greater rigidity and mechanical resistance. Moreover, the fourth portion 34 makes it possible to facilitate the handling of the mask 30 and to increase the stability thereof on the coil, when it is in operating position.

In the third example of embodiment shown in FIGS. 7 to 9, the mask 30 illustrated by FIG. 9 is configured to cooperate with the coil 20 shown in FIG. 8, when it occupies the operating position thereof, so as to form an assembly 10 such as shown in FIG. 7.

The coil 20 according to the third example of embodiment of the assembly 10 comprises, in a similar manner to the coils 20 of the examples of embodiments previously described, two branches 21 and 22 extending between a first end 210, 220 and a second end 211, 221.

Moreover, each first and second branch 21 and 22 has a longitudinal face 213, 223. The longitudinal faces 213 and 223 are intended to be arranged on the side of the part to be deformed during the use of the assembly 10.

Unlike the examples of embodiments previously described, in this third example of embodiment, the junction area 24 is connected to the first and second branches 21 and 22 by the respective longitudinal face 213, 223 thereof, between the first end 210, 210 thereof and the second end 221, 221 thereof, as shown in FIG. 8.

Moreover, the coil 20 differs from that previously described in the first and second examples of embodiments in that the junction area 24 is connected directly to the branches 21 and 22, in the sense that the coil 20 does not have portions 214, 224.

The junction area 24 is formed by a body of substantially parallelepiped geometric shape comprising a face 240 preferably extending perpendicular to the longitudinal faces 213, 223. As shown in FIG. 8, the junction area 24 has a through hole 25, wherein the slot 23 opens.

In this third example of embodiment of the assembly 10, the opening 25 of the coil 20 has a substantially circular straight section.

In the case of a circular type coil, the current is concentrated on a layer delimited by the active surface 27, at the inner peripheral surface 26 of the opening 25.

The part to be deformed is, in this case, intended to be introduced into the opening 25 of the coil 20 during the use of the assembly 10.

As illustrated in FIG. 9, the mask 30 comprises, in a similar manner to the first and second examples of embodiment, a first portion 31 configured to be inserted into the slot 23 and a second portion 32 configured to cover the active surface 27 of the coil 20, when the mask cooperates with the coil 20. The second portion 32 therefore has a shape complementary to the shape of said opening 25, that is to say, in this example of embodiment, a cylindrical shape of circular straight section.

In this example of embodiment, the second and third portions 32 and 33 are combined, in as much as the numerical references "32" and "33" designate the same portion of the mask 30, as shown in FIG. 9.

Preferably, the mask 30 comprises a fourth portion 34 covering at least partially the longitudinal faces 213, 223 and the face 240 of the body, when the mask is in operating position.

The fourth portion 34 here has a shoulder shape.

In the examples of embodiments shown in FIGS. 4, 6, 7 and 9, the mask extends beyond the longitudinal faces 213, 223 of the branches 21 and 22 so as to ensure an electrical insulation between the part to be deformed and the coil 20.

It is important to note that in other examples of embodiments of the assembly 10, the opening 25 may have a straight section of any geometric shape, according to the type of part to be deformed and/or according to the type of deformation operation to be performed.

Three examples of embodiment of assemblies have just been described each comprising a particular type of coil.

In all of these examples of embodiments and in a non-limiting way, the mask 30 is integral and is advantageously made of a flexible material, that is to say a deformable material. Furthermore, this material is preferably chosen so as to have elastic properties, that is to say properties according to which the material resumes the initial shape thereof after deformation.

The material of the mask 30 is chosen so that it preferably has a dielectric strength at least equal to 20 kV/mm and so that it withstands a temperature at least equal to 200° C.

Such a material may be a polymer, such as a silicone or a synthetic resin.

The mask 30 may advantageously be made by overmoulding or compression moulding.

The mask 30 is configured to have dimensions substantially equal to the coil 20 such that, when it cooperates with said coil 20, it is subjected to the latter preferably only by tightening action, for example, by tight fit.

Thanks to these features, the use of a glue or of an adhesive at the interface between the coil 20 and the mask

30 is avoided, which makes it possible to simplify the assembling of the assembly 10, and therefore to reduce the cost thereof.

More generally, it should be noted that the implementations and embodiments of the assembly 10 considered above have been described by way of non-limiting examples and that other variants are accordingly conceivable.

In particular, the invention has been described by considering two examples of geometric shapes of coils, and consequently two examples of geometric shapes of masks. However, nothing excludes, in other types of embodiment, considering other geometric shapes of coils and of masks.

The invention claimed is:

1. An assembly to deform metal parts by a magnetic pulse by at least one of a magnetic pulse forming and a magnetic pulse welding, the assembly comprising: a coil comprising a first branch and a second branch configured to be connected to a power source, the first branch and the second branch extending adjacent to one another so as to define a slot; an active portion of the coil connected to the first branch and the second branch, an active surface of the active portion configured to be disposed opposite a metal part to be deformed; a mask configured to cooperate in a removable and replaceable manner with all or a portion of the coil without use of a glue or an adhesive, the mask having a shape that is at least partially complementary to a shape of the coil such that when the mask is in an operating position, a first portion of the mask is inserted into the slot to insulate the first branch and the second branch from each other, and a second portion of the mask cooperates with the active portion of the coil when the mask is in contact with the coil and covers all of the active surface of the active portion of coil; wherein the mask being made of one piece of an electrically insulating material; and wherein the mask is replaceable with a spare mask by withdrawing the mask from the slot defined by the coil and inserting the spare mask into the slot.

2. The assembly of claim 1, wherein the coil comprises a through opening wherein the slot opens; and wherein the mask comprising a third portion covering an inner peripheral surface of the through opening when the mask is in the operating position.

3. The assembly of claim 1, wherein each of the first branch and the second branch has a longitudinal face configured to be arranged on a side of the metal part to be deformed, the first branch and the second branch being connected to one another by a junction area; and wherein the mask comprises a fourth portion covering at least partially the longitudinal faces and a face of the junction area, when the mask is in the operating position.

4. The assembly of claim 1, wherein the mask is made of a flexible material.

5. The assembly of claim 1, wherein the mask is made of an elastic material.

6. The assembly of claim 1, wherein the mask is made of a silicone material.

7. The assembly of claim 1, wherein the mask is made of a material that can withstand a temperature at least equal to 200° C. and having a dielectric strength at least equal to 20 kV/mm.

8. The assembly of claim 1, wherein the slot is a long, narrow slit.

9. The assembly of claim 1, wherein a thickness of the slot is tens of millimeters.

10. The assembly of claim 1, wherein the slot is of a constant width.

* * * * *